June 22, 1954    E. C. HIRSCHOFF    2,681,569
WIND GAUGING DEVICE FOR SAILBOATS
Filed July 27, 1953
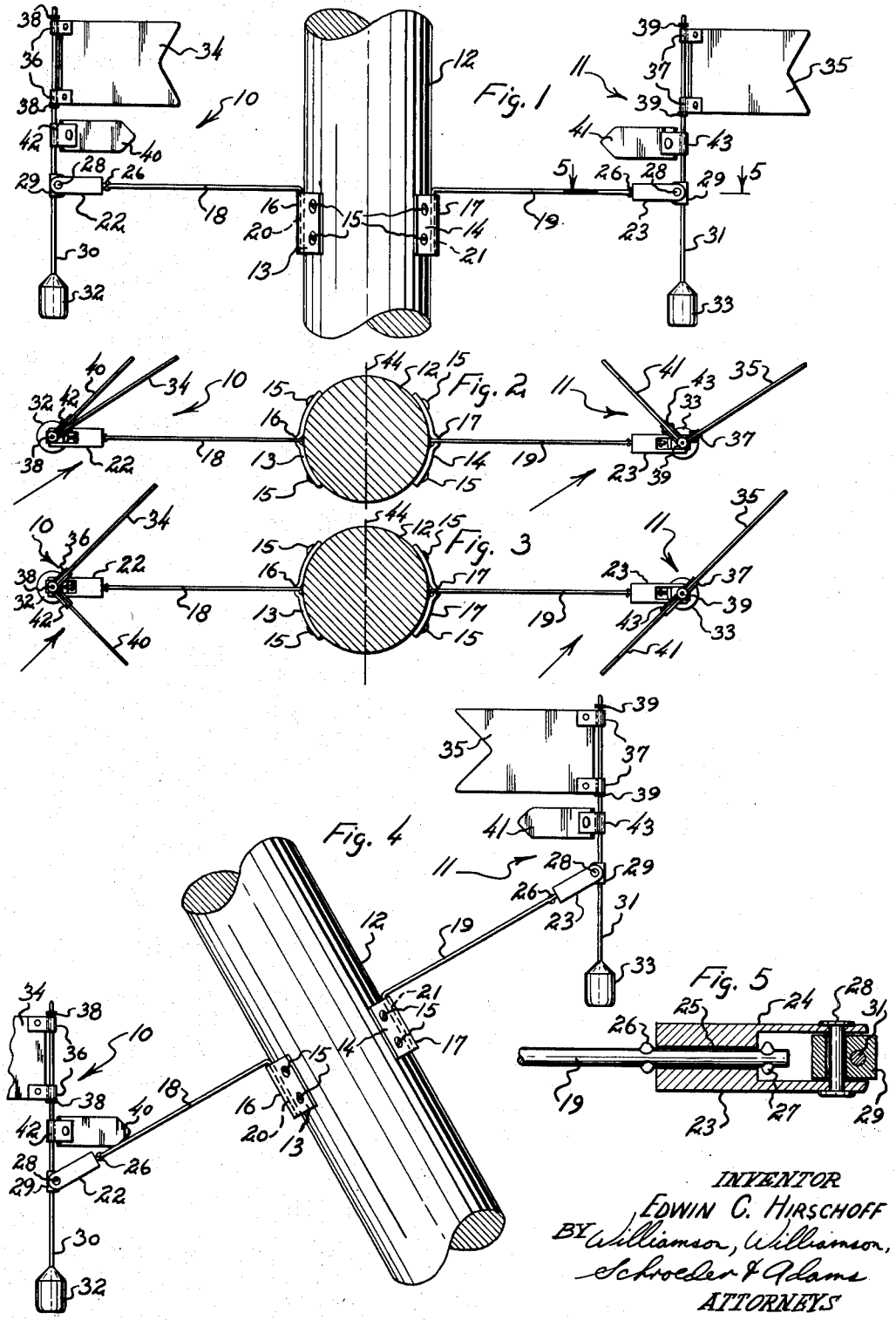
INVENTOR
EDWIN C. HIRSCHOFF
BY Williamson, Williamson,
Schroeder & Adams
ATTORNEYS Patented June 22, 1954

2,681,569

UNITED STATES PATENT OFFICE 2,681,569

WIND GAUGING DEVICE FOR SAILBOATS

Edwin C. Hirschoff, Minneapolis, Minn.

Application July 27, 1953, Serial No. 370,449

5 Claims. (Cl. 73—188)

This invention relates to a device for use in sailboating to give critical and instantaneous information concerning the proper operation of the boat with relation to the wind.

According to prior art practice, one method of determining wind direction and shifting of the wind while sailing, is to employ streamers or a wind vane mounted at the top of the mast and to continuously look at the mast head to take advantage of the wind direction and changes therein. Sometimes the streamers are mounted on the stays or shrouds. Such streamers are not accurate in showing the direction of the apparent wind, that is, the true wind direction modified by the speed and the direction of the boat iself, since they flutter in an unstable manner. Because of their unstable functioning, they are extremely difficult to interpret. The streamers fail to lift themselves in a light wind and in a strong wind are apt to wrap or entwine themselves about the shroud. Furthermore, with the boat itself angulated to the horizontal, as it often is during sailing, the helmsman's difficulties are multiplied. The vane type of wind indicator when mounted at the top of a mast has additional bad features in that the movement to which the mast is continuously subjected is intensified at the upper portion and hence will prevent the vane from giving a true reading of the apparent wind even when freely suspended as in a trunnion. In heeling the effective area against which the wind can operate is materially reduced.

Another prior art device has elaborate and expensive electrical means to convey to the helmsman deviations from a detail setting with respect to the wind as measured by a mast head vane. Here again movement of the mast causes trouble in maintaining a true reading.

My invention contemplates a device which will give full information to the helmsman as to the apparent wind direction at all times and in its relation to the optimum of direction of travel of the boat. As far as I am aware, no device has previously been employed which can give such valuable information without adjustment after the original setting and without more than casual observation from a point convenient to the helmsman.

It is therefore an important object of this invention to provide a simple and inexpensive device for giving apparent wind direction with respect to the direction of travel of a sailboat, the device being mounted in an easy observable position for furnishing instantaneously critical comparative information.

It is another object of the invention to provide a sailboat gauge which will simultaneously and comparatively give the limits of the most advantageous steering of the boat while beating into the wind both while on a tack and immediately after coming about.

It is a further object of the invention to provide an efficient and easily interpreted device for sailboats which will constantly define the approach of the direction of the boat from running free up to the highest point which it can attain into the wind (keeping in the eye of the wind) on either a port tack or a starboard tack, thus preventing luffing of the sails and attendant loss of speed.

It is another object of the invention to provide a device of the class described which may be used to give visual warning of an approaching gybe during change of course or change in the direction of the wind, thereby making possible a planned gybe rather than an accidental one.

A still further object of the invention is to provide a pair of wind and steering gauges for a sailboat which can be mounted on the mast at or near eye level, one of said wind and steering gauges being adapted for observation while the wind is to the port side of the boat and the other adapted to observing while the wind is to the starboard side of the boat.

These and other objects and advantages of my invention will more fully appear from the following description made in connection with the accompanying drawing wherein like reference characters refer to similar parts throughout the several views and in which:

Fig. 1 is a front elevation of a pair of my wind gauging devices attached to a medial portion of a sailboat mast, the view being taken in a direction looking from the front of the boat toward the rear;

Fig. 2 is a top view of the wind gauging devices of Fig. 1, the mast being shown in horizontal section;

Fig. 3 is a top view of the wind gauging devices with the boat in another position with respect to the wind;

Fig. 4 is a front elevation of the wind gauging devices with the mast at an incline position, portions of the view being cut away; and Fig. 5 is a horizontal section of the swivel structure taken on the line 5—5 of Fig. 1, portions being shown in full line.

Referring now to the drawing, my invention comprises a left reference gauge 10 as viewed in Fig. 1 and a right reference gauge 11 in the same view. Although only one of the reference gauges serves a useful function, it is preferred that they be used in pairs as shown, being secured to a mast 12 at a point intermediate the ends of the mast and preferably at or somewhat above eye level so that the helmsman will not be required to look upwardly in an awkward position to observe the behavior of the gauges. Mounting means such as brackets 13 and 14 are secured respectively to the mast 12 by such means as screws 15. The brackets preferably are equipped with an offset rib or channel 16 which is adapted to hold the respective mounting arms 18 and 19 as shown. The mounting arms have bent ends 20 and 21 which extend downwardly into the channels 16 and 17 so that the gauges 10 and 11 may be removed from their brackets and stored away while the sailboat is not in use. The brackets 13 and 14 are preferably mounted on the sailboat mast 12 in diametrical position normal to the center line of the boat (not shown). The arms 18 and 19 extend oppositely and preferably at right angles to the axis of mast 12 to terminate respectively in swivels 22 and 23. Details of the swivel structure are shown in Fig. 5. The swivel may comprise a forked member 24 having a longitudinal bore 25 through which the end of rod or arm 19 can extend. Abutment members 26 and 27 are formed on arm 19 so as to permit free rotation of the forked member 24 but preventing lengthwise movement on the arm or rod 19. The outwardly extending ends of the forked member 24 bear a transverse pivot pin 28 which in turn is adapted to rotatively retain the block 29 as shown in Fig. 5. It is understood that the structure of each of the gauge 10 and 11 may be identical, the only difference during use being the setting of the pointing indicator as will be hereinafter described.

Rigidly mounted in the mounting block 29 is an elongated plumbed reference standard 30 and 31 in the respective gauges 10 and 11. The standards 30 and 31 are straight and stiff, the lower ends thereof terminating plumbs or weights 32 and 33 as shown. The upper ends of the standards 30 and 31 rotatively bear apparent wind indicators 34 and 35 mounted for free rotation horizontally about the axis of their respective standards. The apparent wind indicators are preferably formed as shown from thin and light material such as stiff plastic sheeting. The rear edges of the wind indicators or vanes 34 and 35 have bearing means such as the loops 36 and 37 for encircling the standards 30 and 31 between abutments 38 and 39 respectively secured to each of the standards 30 and 31. It is the purpose of the vanes 34 and 35 to respond quickly and accurately to the slightest wind, the standards 30 and 31 being maintained substantially vertical at all times.

In close proximity to the apparent wind indicators or vanes 34 and 35 are optimum pointing indicators 40 and 41. Each of the pointing indicators comprises a thin and flat pointer member which may be constructed of the same material as the vanes 34 and 35. The pointers 40 and 41 terminate inwardly in brackets 42 and 43 which are frictionally adjustable in a horizontal plane about the axis of the standards 30 and 31 respectively. The brackets 42 and 43 exert a frictional contact with each of the standards of such a magnitude as will resist the influence of even a strong wind but yet can be manually adjusted to fixed relation with respect to their respective standards.

It will be observed that the standards 30 and 31 will remain substantially vertical at all times yet are fixed against rotation upon their own axes. The position of the gauges during extreme tilting of mast 12 is illustrated in Fig. 4. The helmsman will thus have an accurate reading of the gauging devices regardless of the pitch or tilt of the boat. I have found that the forked member 24 can be rigidly mounted to the rod or arm 19 without materially effecting the usefulness of gauge 11. This is true because the greatest swinging movement in a sailboat or yacht occurs from side to side rather than from end to end. In some instances, I prefer to eliminate this rotative connection between the fork member 24 and arm 19 so as to eliminate the pendulum action created by pitching of the boat in its longitudinal direction. It is understood, of course, that the remarks made with respect to gauge 11 apply equally well to the opposite gauge 10.

In the use and operation of my wind gauging device the gauges are mounted one at each side of the mast 12 as shown in Fig. 1. The optimum pointing indicators 40 and 41 are then adjusted as shown in Fig. 2 so as to assume a 45 degree angle with respect to the center line 44, the pointers extending rearwardly toward the helmsman. Each boat has its own optimum pointing position which is usually close to the 45 degree angle. By experimentation, the helmsman can determine the particular pointer setting which is characteristic of his boat and, once the setting is made, may be preserved in its adjusted position. My wind gauging device is particularly useful when beating or tacking into the wind. The sails are then close hauled and the vanes closely observed in relation to their respective pointing indicators 40 and 41. The sail may cover from view of the helmsman one of the gauging devices but the one with which he is concerned will always be in full view. Thus, when making a starboard tack the gauge 10 will be in view with the sail close hauled to the opposite side. The vane 34 is closely observed with reference to indicator 40 and must either coincide with the direction thereof or must lie slightly to the inside of pointer 40. Thus, when approaching the highest pointing value, the vane 34 will have the angular relationship with the pointer 40 as shown in Fig. 2. If the vane 34 swings to the outside of pointer 40, the direction of travel of the boat is changed by tiller to keep the sails from luffing and hence causing the boat to rapidly lose speed. When making a port tack the gauge 11 will be similarly employed, the vane 35 being kept as closely in alignment with the pointer 41 as possible.

At all other sailing positions, my gauging devices are extremely useful in conveying to the helmsman information concerning shifting of the wind and direction of the wind with respect to setting of the sail. Since the wind indicators and pointers are mounted medially of the ends of the mast they can also be compared with the setting of the sail. When running free, the helmsman is often in danger of an accidental gybe. In such instance, the alignment of the gauge 11 may be observed so as to indicate to the helmsman when a dangerous situation exists. Thus, when the vane 35 in Fig. 3 exceeds straight parallel alignment with the center line of the boat a situation exists where an accidental gybe may occur. When thus forewarned, the sails may be close hauled and a planned gybe executed or direction changed all the while maintaining maximum efficiency in the operation of the sailboat.

It may thus be seen that I have devised an extremely useful and inexpensive reference gauge which will give essential composite data at a glance to the helmsman so as to increase the efficiency of sailing and to decrease the hazards in connection therewith.

It will, of course, be understood that various changes may be made in the form, details, arrangement and proportions of the parts without departing from the scope of my invention.

What I claim is:

1. A wind gauging device for sailboats having a mast and a sail comprising, an elongated plumbed reference standard adapted to be mounted swivelly, but non-rotatively with respect to its own axis, in spaced relation at one side of said mast, an apparent wind indicator mounted for free rotation horizontally about the axis of said standard, and an optimum pointing indicator adjustably fixed with respect to the axis of said standard whereby the apparent wind direction may be quickly observed by a helmsman in said boat and may be simultaneously compared with the optimum pointing characteristics of the boat and the setting of the sail.

2. A wind gauging device for sailboats having a mast and a sail comprising, an elongated vertically plumbed reference standard, means securable to the side of the mast and having a universal swivel connection with said standard while maintaining the standard fixed with respect to rotation about its own axis, an apparent wind indicator mounted for free rotation horizontally about the axis of said standard, and an optimum pointing indicator adjustably fixed with respect to the axis of said standard whereby the apparent wind direction may be quickly observed by a helmsman in said boat and may be simultaneously compared with the optimum pointing characteristics of the boat and the setting of the sail.

3. A wind gauging device for sailboats having a mast and a sail comprising, an elongated straight standard fixed with respect to rotation on its own axis but swivelly mounted intermediate its ends in spaced relation with the side of said mast, an apparent wind indicator mounted for free rotation horizontally about the axis of said standard, an optimum pointing indicator adjustably fixed with respect to the axis of said standard, and a plumb weight secured to said straight standard below said swivel mounting so as to maintain said standard in substantially vertical position irrespective of the angulation of said boat with the horizontal whereby the apparent wind direction may be quickly observed by a helmsman in said boat and may be simultaneously compared with the optimum pointing characteristics of the boat and the setting of the sail.

4. A reference gauge for sailboats having at least one mast and at least one sail comprising, a self-plumbing straight and elongated standard adapted to be mounted swivelly, but non-rotatively with respect to its own axis, in spaced relation at one side of said mast, a thin and upstanding vane mounted for free rotation horizontally about the axis of said standard, and a thin and upstanding pointer adjustably fixed with respect to the axis of said standard whereby the wind direction may be quickly observed by a helmsman in said boat and may be simultaneously compared with the optimum pointing characteristics of the boat and the setting of the sail.

5. A right and a left pair of reference gauges securable at a medial position on a mast of a sailboat each comprising an elongated self-plumbing standard swivelly mounted for continuous vertical alignment to the side of said mast, said standard being held against rotation on its own axis during swivel movement, an apparent wind indicator mounted for free rotation horizontally about the vertical axis of said standard, a stiff pointer mounted upon said standard and adjustable inwardly toward the center line of the boat in accordance with the optimum pointing characteristics of the boat, one of said reference gauges being visible and observable by a helmsman in said boat while making port tacks and the other being observable while making starboard tacks.

References Cited in the file of this patent

UNITED STATES PATENTS

| Number | Name | Date |
|---|---|---|
| 1,846,458 | Robinson | Feb. 23, 1932 |
| 2,112,171 | Marlow | Mar. 22, 1938 |
| 2,363,087 | Salisbury | Nov. 21, 1944 |